US012617995B2

(12) United States Patent
Lee

(10) Patent No.: US 12,617,995 B2
(45) Date of Patent: May 5, 2026

(54) RF HEAT DISSIPATION PLASTIC, METHOD FOR MANUFACTURING RF HEAT DISSIPATION PLASTIC, AND REPEATER CABINET USING SAME

(71) Applicant: AMOGREENTECH CO., LTD., Gimpo-si (KR)

(72) Inventor: Jin Hyoung Lee, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 1028 days.

(21) Appl. No.: 17/762,492

(22) PCT Filed: Sep. 16, 2020

(86) PCT No.: PCT/KR2020/012483
§ 371 (c)(1),
(2) Date: Mar. 22, 2022

(87) PCT Pub. No.: WO2021/060765
PCT Pub. Date: Apr. 1, 2021

(65) Prior Publication Data

US 2022/0348813 A1 Nov. 3, 2022

(30) Foreign Application Priority Data

Sep. 23, 2019 (KR) ........................ 10-2019-0116587

(51) Int. Cl.
*C09K 5/14* (2006.01)
*C08L 23/12* (2006.01)
*H04Q 1/02* (2006.01)

(52) U.S. Cl.
CPC ................ *C09K 5/14* (2013.01); *C08L 23/12* (2013.01); *H04Q 1/025* (2013.01); *C08L 2203/20* (2013.01); *C08L 2205/16* (2013.01)

(58) Field of Classification Search
CPC .. C09K 5/14; C08K 9/06; C08K 13/02; C08L 2203/20; C08L 2205/16
See application file for complete search history.

(56) References Cited

U.S. PATENT DOCUMENTS

| | | | | |
|---|---|---|---|---|
| 4,474,685 | A * | 10/1984 | Annis | H05K 9/00 252/511 |
| 9,909,235 | B2 | 3/2018 | Korzhenko et al. | |
| 2002/0038582 | A1 | 4/2002 | Holl | |
| 2017/0101530 | A1* | 4/2017 | Zheng | C09K 5/14 |
| 2017/0342264 | A1 | 11/2017 | Jung | |
| 2020/0157318 | A1* | 5/2020 | Seo | C08L 67/04 |
| 2020/0283618 | A1 | 9/2020 | Choi | |

FOREIGN PATENT DOCUMENTS

| | | | | |
|---|---|---|---|---|
| CN | 1075011838 | A | 12/2017 | |
| CN | 108239324 | A | 7/2018 | |
| KR | 10-2002-0085865 | A | 11/2002 | |
| KR | 10-2015-0077465 | A | 7/2015 | |
| KR | 10-2016-0076447 | A | 6/2016 | |
| KR | 20170009287 | A | 1/2017 | |
| KR | 101817746 | B1 | 1/2018 | |
| KR | 20190055772 | A | 5/2019 | |
| WO | 2014064373 | A1 | 5/2014 | |
| WO | WO-2018190645 | A1 * | 10/2018 | C08B 15/00 |

OTHER PUBLICATIONS

International Search Report issued in PCT/KR2020/012483 dated Jan. 7, 2021, 3 pages.
Li, Yingchun, et al., In Situ Fabrication of Cellulose Nanocrystal-Silica Hybrids and Its Application in UHMWPE: Rheological, Thermal, and Wear Resistance Properties, Polymer Composites, (2018) 39:E1701-E1713.
The First Office Action issued in CN 2020800662532 dated Feb. 16, 2023, 10 pgs.

* cited by examiner

*Primary Examiner* — Jane L Stanley
(74) *Attorney, Agent, or Firm* — ROTHWELL, FIGG, ERNST & MANBECK, P.C.

(57) ABSTRACT

An RF heat dissipation plastic including a polymer matrix comprising a polymer resin; and a first filler that is dispersed in the polymer matrix, and includes a high-strength filler, which is a polymer containing at least one hydroxy group in the repeating unit thereof, and an inorganic coating layer formed on at least a part of the surface of the high-strength filler. Therefore, the RF heat dissipation plastic has a low dielectric constant and excellent mechanical strength are simultaneously exhibited.

10 Claims, 4 Drawing Sheets

RF HEAT DISSIPATION PLASTIC, METHOD FOR MANUFACTURING RF HEAT DISSIPATION PLASTIC, AND REPEATER CABINET USING SAME

CROSS-REFERENCE TO RELATED APPLICATION

This application is a 35 U.S.C. 371 National Phase Entry Application from PCT/KR2020/012483, filed Sep. 16, 2020, which claims priority to and the benefit of Korean Patent Application No. 10-2019-0116587, filed on Sep. 23, 2019, the disclosures of which are incorporated herein by reference in their entireties.

TECHNICAL FIELD

The present invention relates to an RF heat dissipation plastic, and more specifically to an RF heat dissipation plastic, a method for manufacturing an RF heat dissipation plastic and a repeater cabinet using the same.

BACKGROUND ART

A repeater for mobile communication refers to a device that receives weakened signals in the middle of a communication system, amplifies and retransmits the same, or modulates the waveform of a distorted signal and adjusts or reconstructs the timing and transmits the same. Such a repeater was initially intended for simply retransmitting signals, but recently, it plays the role of a low-cost base station in consideration of service coverage that saves equipment and operating costs.

Meanwhile, the signals transmitted and received through a mobile communication repeater are radio waves, and 5G, which is currently in the process of building networks ahead of commercialization, uses the high frequency bands of 3.5 GHz and 28 GHz, and it uses significantly higher high-frequency bands compared to 4G, and thus, due to the communication characteristics of lower diffraction (strong straightness) and a shorter radio wave reach than 4G, 5G requires the installation of more base stations or repeaters than 4G.

However, as the frequency of electric signals increases, there is a characteristic that the transmission loss increases, and therefore, the development of a material having excellent high-frequency transmission characteristics is an essential factor.

In the case of materials with conventional high-frequency transmission characteristics, it was not possible to simultaneously achieve a low dielectric constant and high mechanical strength at a desired level, and there were also technical limitations to expressing excellent heat dissipation performance, and these characteristics could not be uniformly expressed in the entire area. As such, the situation is that there is an urgent need to develop a material which can minimize or prevent signal interference in high-frequency bands due to its low dielectric constant, exhibit excellent heat dissipation characteristics while having excellent mechanical strength, and have high-frequency transmission characteristics that exhibit uniform low-dielectric properties, mechanical strength and heat-dissipation characteristics in the entire area.

DISCLOSURE

Technical Problem

The present invention has been devised in view of the above points, and it is an object of the present invention to provide an RF heat dissipation plastic that is capable of simultaneously expressing the effects of having a low dielectric constant and excellent mechanical strength.

In addition, it is another object of the present invention to provide an RF heat dissipation plastic that exhibits excellent heat dissipation performance even though it is designed to have a low dielectric constant and excellent mechanical strength, and a repeater implemented by including the same.

In addition, it is still another object of the present invention to provide an RF heat dissipation plastic that uniformly expresses low dielectric properties, excellent mechanical strength and excellent heat-dissipating properties in the entire area, and a repeater implemented by including the same.

Furthermore, it is still another object of the present invention to provide various products across all industries, such as an RF heat dissipation plastic that can minimize the performance degradation or malfunction of a repeater cabinet that can be affected by the transmission and reception of high-frequency band signals according to the dielectric constant, a repeater implemented by including the same and the like.

Technical Solution

In order to solve the aforementioned problems, the present invention provides an RF heat dissipation plastic, including a polymer matrix including a polymer resin; and a first filler that is dispersed in the polymer matrix and includes a high-strength filler, which is a polymer including at least one hydroxy group in the repeating unit thereof, and an inorganic coating layer formed on at least a part of the surface of the high-strength filler.

According to an exemplary embodiment of the present invention, the high-strength filler may include at least one selected from the group consisting of cellulose nanofibrils and cellulose fibers.

In addition, the high-strength filler may have an average cross-sectional diameter of 10 nm to 20 μm, and the inorganic coating layer may have an average thickness of 5 to 30 nm.

In addition, the inorganic coating layer may be an inorganic coating layer in which a silicon-based compound, which includes at least one selected from the group consisting of a straight-chain silicic acid group in which two or more orthosilicic acid groups and orthosilicic acid groups are mutually polymerized, a pulverized silicic acid group in which four or more orthosilicic acid groups are mutually polymerized, and a cyclic silicic acid group in which three or more orthosilicic acid groups are mutually polymerized, is combined with the high-strength filler.

In addition, in the first filler, at least one hydroxy group of the silicon-based compound may be chemically bonded to a hydroxy group of the high-strength filler.

In addition, the first filler may include 50 to 250 parts by weight of the inorganic coating layer based on 100 parts by weight of the high-strength filler.

In addition, the RF heat dissipation plastic may include 1 to 15 parts by weight of the first filler based on 100 parts by weight of the polymer resin.

In addition, the polymer resin may include one compound or two or more compounds or copolymers selected from the group consisting of polycarbonate, polyamide, polyester, polyketone, liquid crystal polymer, polyolefin, polyphenylene sulfide (PPS), polyether ether ketone (PEEK), polyphenylene oxide (PPO), polyether sulfone (PES), polyether imide (PEI), polyimide (PI), polyphthalamide (PPA), polybutylene terephthalate (PBT), acrylonitrile butadiene styrene copolymer resin (ABS), polymethyl methacrylate (PMMA) and polyarylate (PAR).

In addition, the RF heat dissipation plastic may further include a second filler dispersed in the polymer matrix to improve heat dissipation characteristics.

In addition, the second filler may have an average particle diameter of 5 to 300 μm.

In addition, the second filler may include a non-insulating filler including at least one selected from the group consisting of a carbon-based filler including at least one selected from the group consisting of carbon black, graphite and carbon nanomaterials, a metal-based filler including at least one selected from the group consisting of copper, silver, nickel, gold, platinum and iron, and a non-insulating graphite composite; and an insulating filler including at least one selected from the group consisting of magnesium oxide, yttrium oxide, zirconium oxide, titanium dioxide, aluminum nitride, silicon nitride, boron nitride, aluminum oxide, silica, zinc oxide, barium titanate, strontium titanate, beryllium oxide, manganese oxide, talc, silicon carbide, silicon dioxide, single crystal silicon, and an insulating graphite composite.

In addition, the RF heat dissipation plastic may further include 30 to 200 parts by weight of the second filler based on 100 parts by weight of the polymer resin.

In addition, the present invention provides a method for manufacturing an RF heat dissipation plastic, including (1) manufacturing a first filler by treating at least a part of the surface of a high-strength filler including at least one hydroxy group in the repeating unit thereof with an inorganic coating precursor; and (2) dispersing the first filler in a polymer resin.

According to an exemplary embodiment of the present invention, the inorganic coating precursor may include tetrahydroxysilane (TEOS).

In addition, step (1) may treat the high-strength filler and the organic coating precursor at a weight ratio of 1:10 to 50.

In addition, step (1) may include (1)-1 reacting the high-strength filler and the inorganic coating precursor for 3 to 13 hours; and (1)-2 aging the reacted high-strength filler for 0.3 to 3 hours.

In addition, the present invention provides a repeater cabinet having an accommodating part in which a device for relaying an RF signal is accommodated therein, wherein at least a part of the repeater cabinet is the above-described RF heat dissipation plastic.

Advantageous Effects

According to the present invention, since the RF heat dissipation plastic includes a first filler, the dielectric constant is low and the mechanical strength is excellent at the same time. In addition, even though it has a low dielectric constant and is designed to have excellent mechanical strength, it exhibits excellent heat dissipation performance by including a second filler for improving heat dissipation characteristics. In addition, as the first filler and the second filler have excellent dispersibility, uniform low-dielectric properties, mechanical strength and heat dissipation properties are expressed in the entire area. Since the RF heat dissipation plastic according to the present invention, which uniformly expresses such low dielectric constant, excellent mechanical strength and heat dissipation performance over the entire area, can minimize performance degradation or the loss of function of a repeater cabinet that can be affected by the transmission and reception of high-frequency signals according to the dielectric constant, it can be widely applied to various products across all industries.

BEST MODE

Figure 1:
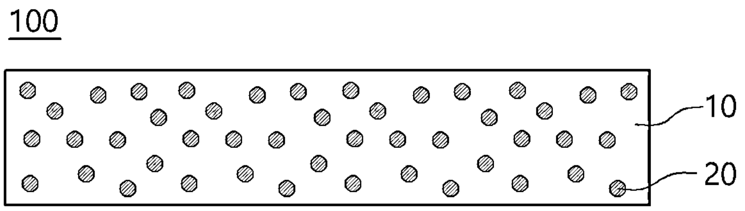
FIG. 1 is a cross-sectional view of the RF heat dissipation plastic according to an exemplary embodiment of the present invention.

Hereinafter, exemplary embodiments of the present invention will be described in detail with reference to the accompanying drawings such that those of ordinary skill in the art to which the present invention pertains can easily practice the present invention. The present invention may be embodied in many different forms and is not limited to the exemplary embodiments described herein. In order to clearly describe the present invention in the drawings, parts that are irrelevant to the description are omitted, and the same reference numerals are assigned to the same or similar components throughout the specification.

Figure 3:
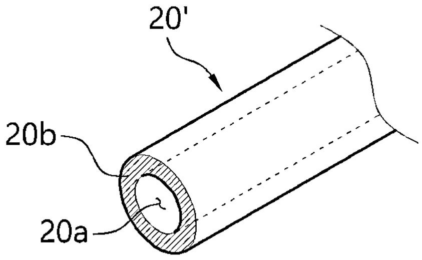
FIG. 3 is a schematic cross-sectional view of the first filler according to an exemplary embodiment of the present invention.

As illustrated in FIGS. 1 and 3, the RF heat dissipation plastic 100 according to the present invention is implemented by including a polymer matrix 10 including a polymer resin; and a first filler 20, 20' that is dispersed in the polymer matrix 10 and includes a high-strength filler **20*a*, which is a polymer including at least one hydroxy group in the repeating unit thereof, and an inorganic coating layer 20*b*** formed on at least a part of the surface of the high-strength filler.

First, the polymer matrix 10 will be described.

The polymer matrix 10 is a carrier that holds the first filler 20, 20' to be described below, and maintains the shape of the RF heat dissipation plastic and exhibits a predetermined mechanical strength, and the polymer resin forming the polymer matrix may be used without limitation as long as it is an organic compound that can be commonly used in the art, and preferably, it may be one compound or two or more compounds or copolymers selected from the group consisting of polycarbonate, polyamide, polyester, polyketone, liquid crystal polymer, polyolefin, polyphenylene sulfide (PPS), polyether ether ketone (PEEK), polyphenylene oxide (PPO), polyether sulfone (PES), polyether imide (PEI) and polyimide.

In this case, the polyamide may be a known polyamide compound such as nylon 6, nylon 66, nylon 11, nylon 610, nylon 12, nylon 46, nylon 9T (PA-9T), Qiana, Aramid and the like.

For example, the polyester may be a known polyester-based compound such as polyethylene terephthalate (PET), polytrimethylene terephthalate (FIT), polybutylene terephthalate (PBT), polycarbonate and the like.

As another example, the polyolefin may be a known polyolefin-based compound such as polyethylene, polypropylene, polystyrene, polyisobutylene, ethylene vinyl alcohol and the like.

The liquid crystal polymer may be used without limitation in the case of a polymer exhibiting liquid crystallinity in a solution or dissolved state, and since it may be a known type, the present invention does not particularly limit the same.

Meanwhile, since the repeater cabinet to which the RF heat dissipation plastic is applied must exhibit predetermined low dielectric properties and excellent mechanical strength, the RF heat dissipation plastic according to an exemplary embodiment of the present invention may use the polymer resin described above as a polymer resin.

Next, the first filler 20, 20' will be described.

Figure 4:
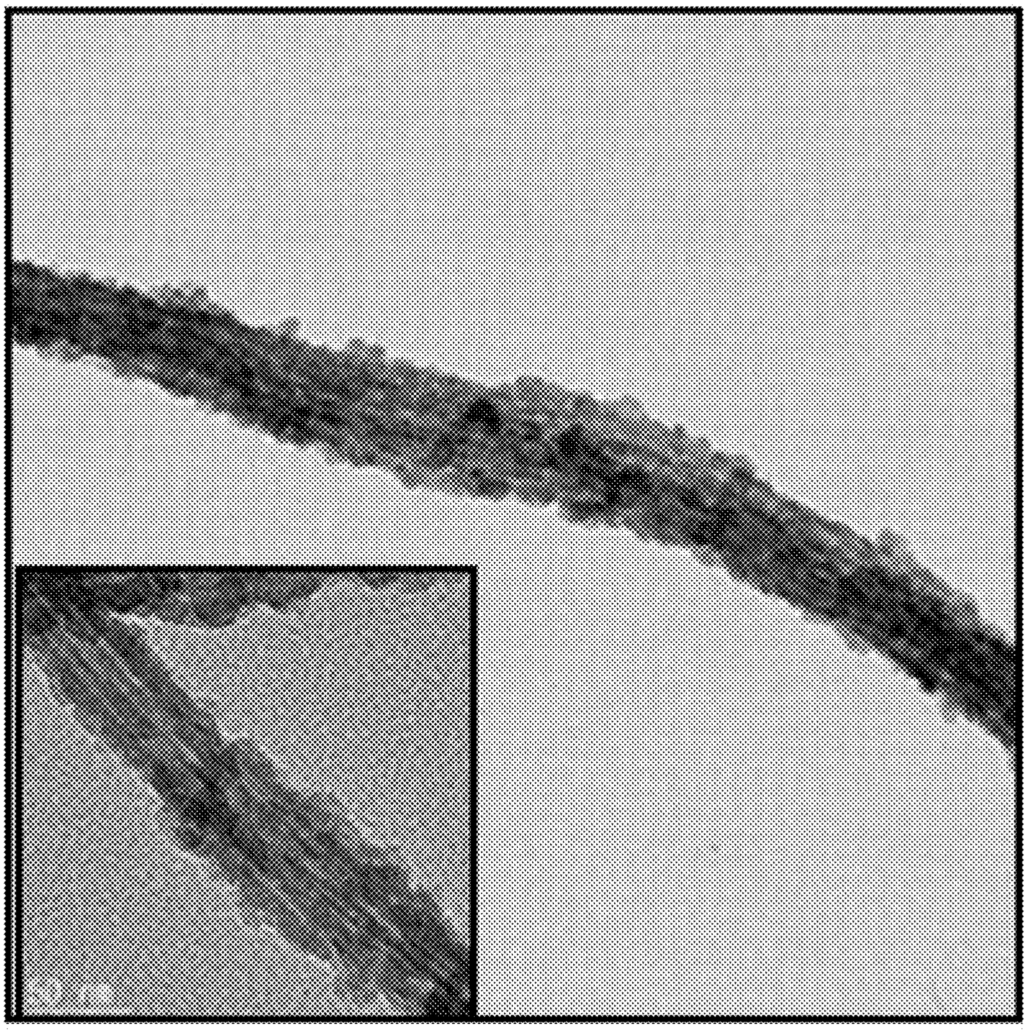
FIG. 4 is an electron microscope image of the first filler according to an exemplary embodiment of the present invention.

As illustrated in FIGS. 3 and 4, the first filler 20, 20' is implemented by including a high-strength filler 20*a*, which is a polymer including at least one hydroxy group in the repeating unit thereof, and an inorganic coating layer 20*b*, which is formed on at least a part of the surface of the high-strength filler 20*a*.

The high-strength filler 20*a* may be used without limitation, as long as it is a high-strength filler commonly used in the art, but preferably, it may be a cellulose-based filler including at least one selected from the group consisting of cellulose nanofibrils and cellulose fibers in order to exhibit low dielectric properties and excellent mechanical strength at a desired level, and more preferably, it may be a cellulose nanofibril.

In addition, the high-strength filler 20*a* may have an average cross-sectional diameter of 10 nm to 20 μm, and preferably, an average cross-sectional diameter of 20 nm to 10 μm. If the average cross-sectional diameter of the high-strength filler is less than 10 nm, the desired level of mechanical strength may not be expressed, and if the average cross-sectional diameter is more than 20 μm, the dispersibility may decrease such that uniform low dielectric properties, mechanical strength and heat dissipation may not be exhibited.

The inorganic coating layer 20*b* improves the dispersibility of the first filler 20, 20', and when the high-strength filler 20*a* is a cellulose-based filler, it prevents yellowing and performs a function of expressing low dielectric properties, and it is not limited as long as it is a material that can conventionally form an inorganic coating layer in the art, but preferably, if it is an inorganic coating layer in which a silicon-based compound, which includes at least one selected from the group consisting of a straight-chain silicic acid group in which two or more orthosilicic acid groups and orthosilicic acid groups are mutually polymerized, a pulverized silicic acid group in which four or more orthosilicic acid groups are mutually polymerized, and a cyclic silicic acid group in which three or more orthosilicic acid groups are mutually polymerized, is combined with the high-strength filler, it may be more advantageous in improving the dispersibility of the first filler and preventing yellowing when the high-strength filler is a cellulose-based filler.

As an example of the silicon-based compound forming the inorganic coating layer 20*b*, orthosilicic acid forming the orthosilicic acid group may be a compound represented by Chemical Formula 1 below, a straight-chain silicic acid group in which two or more orthosilicic acid groups are mutually polymerized may a compound represented by Chemical Formula 2 below, a pulverized silicic acid group in which four or more orthosilicic acid groups are mutually polymerized may a compound represented by Chemical Formula 3 below, and a cyclic silicic acid group in which three or more orthosilicic acid groups are mutually polymerized may be a compound represented by Chemical Formula 4 below.

[Chemical Formula 1]

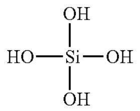

[Chemical Formula 2]

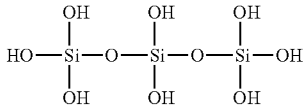

[Chemical Formula 3]

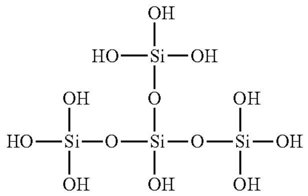

[Chemical Formula 4]

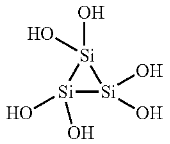

Meanwhile, as the straight-chain silicic acid group, the pulverized silicic acid group and the cyclic silicic acid group may be respectively formed by interpolymerizing the orthosilicic acid group more than the compounds represented by Chemical Formulas 2 to 4, the straight-chain silicic acid group, the pulverized silicic acid group and the cyclic silicic acid group are not limited to the compounds represented by Chemical Formulas 2 to 4.

In this case, as the silicon-based compound according to the present invention includes a hydroxy group similar to the compounds represented by Chemical Formulas 1 to 4, at least one hydroxy group of the silicon-based compound may be chemically bonded to the hydroxy group of the high-strength filler 20*a*, and in particular, as it includes a large amount of hydroxy groups such as the compounds represented by Chemical Formulas 1 to 4, it may be more easily chemically bonded to the hydroxy group of the high-strength filler 20*a*, and thus, it may be very advantageous in improving the dispersibility of the first filler and preventing yellowing when the high-strength filler is a cellulose-based filler.

Meanwhile, the inorganic coating layer 20*b* may have an average thickness of 5 to 30 nm, and preferably, an average thickness of 10 to 20 nm. If the average thickness of the inorganic coating layer is less than 5 nm, or if the average thickness is more than 30 nm, the dispersibility of the first filler may not be improved to a desired level, and if the high-strength filler is a cellulose-based filler, the occurrence of yellowing may be prevented, and thus, it is not possible to exhibit dielectric properties.

In addition, the first filler 20, 20' may include 50 to 250 parts by weight, and preferably, 100 to 200 parts by weight of the inorganic coating layer 20*b* based on 100 parts by weight of the high-strength filler 20*a*. If the inorganic coating layer is less than 50 parts by weight or more than 250 parts by weight based on 100 parts by weight of the high-strength filler, the dispersibility of the first filler may not be improved to a desired level, and yellowing may not be prevented when the high-strength filler is a cellulose-based filler, and thus, it is not possible to exhibit low dielectric properties.

The first filler 20, 20' may be included in an amount of 1 to 15 parts by weight, preferably, 1.5 to 13 parts by weight, based on 100 parts by weight of the polymer resin. If the first filler is less than 1 part by weight based on 100 parts by weight of the polymer resin, the dielectric constant may increase and the mechanical strength may be lowered, and if it is more than 15 parts by weight, the mechanical strength may be rather deteriorated.

Meanwhile, the first filler may be a fibrous form as illustrated in FIG. 3, or may be a granular form which is formed by gathering fibrous fillers, but the present invention does not particularly limit the same.

Figure 2:
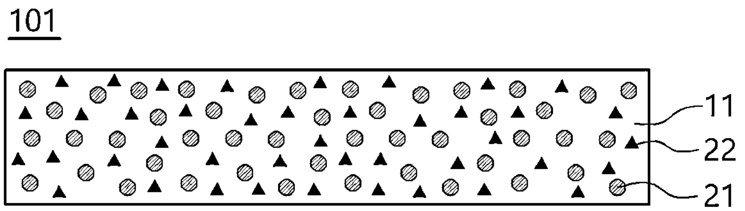
FIG. 2 is a cross-sectional view of the RF heat dissipation plastic according to another exemplary embodiment of the present invention.

Meanwhile, as illustrated in FIG. 2, the RF heat dissipation plastic 101 according to another exemplary embodiment of the present invention may include a polymer matrix 11 including a polymer resin; and a first filler 21 that is dispersed in the polymer matrix 11 and includes a high-strength filler, which is a polymer including at least one hydroxy group in the repeating unit thereof, and an inorganic coating layer formed on at least a part of the surface of the high-strength filler, and may further include a second filler 22 dispersed and provided in the polymer matrix 11 in order to improve heat dissipation characteristics.

The second filler 22 performs a function of improving the heat dissipation characteristics of the RF heat dissipation plastic 101, and any filler that can be conventionally used to improve heat dissipation characteristics in the art may be used without limitation, and preferably, it may include a non-insulating filler including at least one selected from the group consisting of a carbon-based filler comprising at least one selected from the group consisting of carbon black, graphite and carbon nanomaterials, a metal-based filler including at least one selected from the group consisting of copper, silver, nickel, gold, platinum and iron, and a non-insulating graphite composite; and an insulating filler including at least one selected from the group consisting of magnesium oxide, yttrium oxide, zirconium oxide, titanium dioxide, aluminum nitride, silicon nitride, boron nitride, aluminum oxide, silica, zinc oxide, barium titanate, strontium titanate, beryllium oxide, manganese oxide, talc, silicon carbide, silicon dioxide, single crystal silicon, and an insulating graphite composite.

In addition, the shape of the second filler 22 may be a spherical shape or plate-shaped granular shape, but the shape of the second filler may be changed according to the purpose, and thus, the present invention does not particularly limit the same.

Meanwhile, the graphite composite may include a graphite composite including graphite, nanoparticles bonded to the surface of the graphite, and a catecholamine layer, and may further include a polymer layer.

The graphite is a mineral in which planar macromolecules in which six-membered rings of carbon atoms are infinitely connected in a plane are stacked in a layered layer, and it may be a known type in the art, and specifically, it may be any one natural graphite of impression graphite, high crystalline graphite and earth graphite, or artificial graphite. When the graphite is natural graphite, for example, it may be expanded graphite obtained by expanding the impression graphite. The artificial graphite may be prepared through a known method. For example, it may be prepared by preparing a thermosetting resin such as polyimide in a film shape of 25 μm or less and graphitizing at a high temperature of 2,500° C. or more to produce single-crystal graphite, or by thermally decomposing hydrocarbons such as methane at a high temperature to prepare highly oriented graphite by chemical vapor deposition (CVD).

In addition, the shape of the graphite may be a known shape, such as a spherical shape, a plate shape, a needle shape or the like, or an atypical shape, and for example, it may be a plate shape. The graphite may be high-purity graphite having a purity of 99% or more, and it may be advantageous in expressing more improved physical properties through the above.

The nanoparticles bound to the surface of the graphite described above function as a medium capable of providing the graphite with a catecholamine layer, which will be described below. When the above is specifically described, as the surface of the graphite described above is hardly provided with functional groups that can mediate chemical reactions, it is not easy to provide a catecholamine layer that can improve the dispersibility of graphite in heterogeneous materials on the surface of the graphite, and there is a problem in that the amount of catecholamine remaining in the actual graphite is very small even if catecholamine is treated with graphite. In addition, in order to solve this problem, there is a limitation to increasing the amount of catecholamine provided on the surface of the modified graphite even if the modification treatment is performed such that the functional groups are provided on the surface of graphite. However, in the case of graphite having nanoparticles on the surface, as catecholamine is easily bonded to the surface of the nanoparticles, there is an advantage that a desired amount of catecholamine may be introduced into the graphite.

When the graphite composite is a non-insulating graphite composite, the nanoparticles may be a metal or a non-metal material that exists as a solid at room temperature, and as a non-limiting example thereof, it may be selected from an alkali metal, an alkaline earth metal, a lanthanum group, an actinium group, a transition metal, a post-transition metal, a metalloid and the like on the periodic table. For example, the nanoparticles may be Ni, Si, Ti, Cr, Mn, Fe, Co, Cu, Sn, In, Pt, Au, Mg and combinations thereof, and it is preferably Cu, Ni or Si.

In addition, when the graphite composite is an insulating graphite composite, the nanoparticles may include at least one selected from the group consisting of magnesium oxide, yttrium oxide, zirconium oxide, titanium dioxide, aluminum nitride, silicon nitride, boron nitride, aluminum oxide, silica, zinc oxide, barium titanate, strontium titanate, beryllium oxide, manganese oxide, talc, silicon carbide, silicon dioxide and single crystal silicon.

Next, the catecholamine layer may be provided at least on the surface of the above-described nanoparticles, thereby improving the excellent fluidity, dispersibility, and interfacial bonding properties between the graphite composite and the polymer compound in the polymer compound of heterogeneous materials to be described below. In addition, the catecholamine layer itself has a reducing power, and at the same time, the amine functional group forms a covalent bond by the Michael addition reaction to the catechol functional group on the surface of the layer, and thus, the secondary surface modification using the catecholamine layer as an adhesive material is possible, and for example, it may act as a bonding material capable of introducing a polymer layer into graphite in order to express more improved dispersibility in the polymer compound.

The catecholamine forming the catecholamine layer is a term that refers to a single molecule having a hydroxy group (—OH) as an ortho-group of a benzene ring, and various alkylamines as a para-group. As non-limiting examples of various derivatives of such a construct, there are dopamine, dopamine-quinone, epinephrine, alpha-methyldopamine, norepinephrine, alpha-methyldopa, droxidopa, indolamine, serotonin or 5-hydroxydopamine, and for example, the catecholamine layer may be a dopamine layer.

Meanwhile, a polymer layer may be further coated on the catecholamine layer, and further improved dispersibility and interfacial bonding properties may be implemented as compatibility with a polymer resin forming an RF heat dissipation plastic increases due to the polymer layer. The polymer layer may be the same as or different from the polymer resin, and a specific type may be known.

Meanwhile, the second filler 22 may have an average particle diameter of 5 to 300 μm, and preferably, an average particle diameter of 10 to 250 μm. If the average particle diameter of the second filler is less than 5 μm, detachment may occur, such as the heat dissipation filler coming off the surface, the dispersibility may be lowered and the heat dissipation characteristics may be deteriorated, and if the average particle diameter is more than 300 μm, the surface quality of the RF heat dissipation plastic may be deteriorated, and the mechanical strength may be deteriorated.

In addition, the second filler 22 may be further included in an amount of 30 to 200 parts by weight, and preferably, 50 to 150 parts by weight, based on 100 parts by weight of the polymer resin. If the second filler further included is less than 30 parts by weight, based on 100 parts by weight of the polymer resin, the heat dissipation characteristics may be relatively deteriorated, and if it is more than 200 parts by weight, the surface characteristics or the mechanical strength of the RF heat dissipation sheet may be deteriorated.

Meanwhile, the RF heat dissipation plastic according to an exemplary embodiment of the present invention may be implemented by including, as additives, at least one selected from the group consisting of an antioxidant, an impact improver, a flame retardant, a strength improver, a heat stabilizer, a light stabilizer, a plasticizer, an antistatic agent, a work improver, a UV absorber, a dispersant and a coupling agent.

The antioxidant prevents the main chain of the polymer compound from being broken by shear during extrusion and injection, and is provided to prevent heat discoloration. For the antioxidant, known antioxidants may be used without limitation, and non-limiting examples thereof may include organophosphites such as tris(nonylphenyl)phosphite, tris(2, 4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with diene, such as tetrakis[methylene(3,5-di-tert-butyl-4-hydroxyhydrocinnamate)] methane, or the like; butylated reaction products of para-cresol or dicyclopentadiene; alkylated hydroquinone; hydroxylated thiodiphenyl ether; alkylidene-bisphenol; benzyl compounds; esters of monohydric or polyhydric alcohols and beta-(3,5-di-tert-butyl-4-hydroxyphenyl)-propionic acid; esters of monohydric or polyhydric alcohols and beta-(5-tert-butyl-4-hydroxy-3-methylphenyl)-propionic acid; esters of thioalkyl or thioaryl compounds such as distearylthiopropionate, dilaurylthiopropionate, ditridecylthiopropionate, octadecyl-3-(3,5-di-tert-butyl-t-4-hydroxyphenyl)propionate, pentaerythrityl-tetrakis]3-(3,5-di-tert-butyl-4-hydroxyphenyl)propionate or the like; and amides of beta-(3,5-di-tert-butyl-4-hydroxyphenyl)-propionic acid or the like, or mixtures thereof. The antioxidant may be provided in an amount of 0.01 to 0.5 parts by weight based on 100 parts by weight of the polymer resin.

The impact modifier may be used without limitation in the case of a known component capable of improving the impact resistance by expressing the flexibility and stress relaxation properties of a composite material, and for example, at least one component selected from the group consisting of thermoplastic polyurethane (TPU), thermoplastic polyolefin (TPO), maleic acid-grafted EPDM, core/shell structured elastic particles, rubber-based resins and polyamide-based materials may be provided as the impact modifier. The thermoplastic polyolefin is a group of materials similar to rubber, and it may be a linear polyolefin block copolymer having a polyolefin block such as polypropylene, polyethylene and the like and a rubber block, or a blend of polypropylene and ethylene-propylene-diene monomer (EPDM), which is an ethylene-based elastomer. In addition, since a known thermoplastic polyolefin may be used, the description of a specific type thereof will be omitted in the present invention. In addition, since a known thermoplastic polyurethane may be used, the description of a specific type thereof will be omitted. In addition, for the elastic particles of the core/shell structure, for example, an allyl-based resin may be used for the core, and for the shell portion, it may be a polymer resin having a functional group capable of reacting to increase compatibility and bonding strength with the polymer resin.

The flame retardant may include, for example, halogenated flame retardants, like tetrabromo bisphenol A oligomers such as BC58 and BC52, brominated polystyrene or poly(dibromo-styrene), brominated epoxy, decabromodiphenylene oxide, pentabromobenzyl acrylate monomer, pentabromobenzyl acrylate polymer, ethylene-bis(tetrabromophthalimide, bis(pentabromobenzyl)ethane and metal hydroxides such as $Mg(OH)_2$ and $Al(OH)_3$), melamine cyanurate, phosphor-based FR systems such as red phosphorus, melamine polyphosphate, phosphate ester, metal phosphinate, ammonium polyphosphate, expandable graphite, sodium or potassium perfluorobutane sulfate, sodium or potassium perfluorooctane sulfate, sodium or potassium diphenylsulfonate and sodium- or potassium-2,4,6,-trichlorobenzoate and N-(p-tolylsulfophonyl)-p-toluenesulfimide potassium salt, N—(N'-benzylaminocarbonyl) sulfanylimide potassium salt, or a mixture thereof, but is not limited thereto. The flame retardant may be included in an amount of 0.1 to 50 parts by weight based on 100 parts by weight of the polymer resin.

The strength improver may be used without limitation in the case of a known component capable of improving the strength of a composite material, and as non-limiting examples thereof, at least one component selected from the group consisting of glass fiber, glass beads, zirconium oxide, wollastonite, gibbsite, boehmite, magnesium aluminate, dolomite, calcium carbonate, magnesium carbonate, mica, talc, silicon carbide, kaolin, calcium sulfate, barium sulfate, silicon dioxide, ammonium hydroxide, magnesium hydroxide and aluminum hydroxide may be included as the strength improver. For example, the strength improver may be a glass fiber. The strength improver may be included in an amount of 5 to 35 parts by weight, preferably 15 to 35 parts by weight, and more preferably 25 to 33.3 parts by weight, based on 100 parts by weight of the polymer resin.

Meanwhile, when a glass fiber is used as the strength improver, the glass fiber may have a length of 2 to 8 mm, preferably 2 to 7 mm, and most preferably, 4 mm, and it may have an average fiber diameter of 1 to 30 μm, preferably, 3 to 20 μm, and most preferably, 10 μm.

In addition, the heat stabilizer may be used without limitation in the case of a known heat stabilizer, and non-limiting examples thereof include organophosphites such as triphenyl phosphite, tris-(2,6-dimethylphenyl)phosphite, tris-(mixed mono- and di-nonylphenyl)phosphate or the like; phosphates such as dimethylbenzene phosphonate or the like, trimethyl phosphate, or the like, or mixtures thereof. The heat stabilizer may be included in an amount of 0.01 to 0.5 parts by weight based on 100 parts by weight of the polymer resin.

In addition, the light stabilizer may be used without limitation in the case of a known light stabilizer, and non-limiting examples thereof may include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like, or mixtures thereof.

In addition, the plasticizer may be used without limitation in the case of a known plasticizer, and non-limiting examples thereof may include dioctyl-4,5-epoxy-hexahydrophthalate, tris-(octoxycarbonylethyl)isocyanurate, phthalic esters such as tristearin, epoxidized soybean oil or the like, or mixtures thereof. The plasticizer may be included in an amount of 0.5 to 3.0 parts by weight based on 100 parts by weight of the polymer resin.

In addition, as the antistatic agent, a known antistatic agent may be used without limitation, and non-limiting examples thereof may include glycerol monostearate, sodium stearyl sulfonate, sodium dodecylbenzenesulfonate, polyether block amides, or mixtures thereof, which may be commercially obtained from, for example, BASF under the trade name Irgastat; Alkema under the trade name PEBAX; Sanyo Chemical industries under the trade name Pelestat. The antistatic agent may be included in an amount of 0.1 to 1.0 parts by weight based on 100 parts by weight of the polymer resin.

In addition, as the work improver, a known work improver may be used without limitation, and non-limiting examples thereof may include metal stearate, stearyl stearate, pentaerythritol tetrastearate, beeswax, montan wax, paraffin wax, polyethylene wax or the like, or mixtures thereof. The work improver may be included in an amount of 0.1 to 1.0 parts by weight based on 100 parts by weight of the polymer resin.

In addition, as the UV absorber, a known UV absorber may be used without limitation, and non-limiting examples thereof include hydroxybenzophenone; hydroxybenzotriazole; hydroxybenzotriazine; cyanoacrylate; oxanilides; benzoxazinones; 2-(2H-benzotriazol-2-yl)-4-(1,1,3,3,-tetramethylbutyl)-phenol; 2-hydroxy-4-n-octyloxybenzophenone; 2-[4,6-bis(2,4-dimethylphenyl)-1,3,5-triazine-2-yl]-5-(octyloxy)-phenol; 2,2'-(1,4-phenylene)bis(4H-3,1-benzoxazine-4-one); 1,3-bis[(2-cyano-3,3-diphenylacryloyl)oxy]-2,2-bis[[(2-cyano-3,3-biphenylacryloyl)oxy]methyl]propane; 2,2'-(1,4-phenylene)bis(4H-3,1-benzoxazine-4-one); 1,3-bis[(2-cyano-3,3-diphenylacryloyl)oxy]-2,2-bis[[(2-cyano-3,3-diphenylacryloyl)oxy]methyl]propane; nano-sized inorganic materials such as titanium oxide, cerium oxide and zinc oxide having a particle diameter of less than 100 nm; or the like, or mixtures thereof. The UV absorber may be included in an amount of 0.01 to 3.0 parts by weight based on 100 parts by weight of the polymer resin.

In addition, as the dispersant and the coupling agent, a known dispersant and a coupling agent may be used without limitation, and as a non-limiting example of the coupling agent, maleic acid-grafted polypropylene, a silane-based coupling agent and the like may be used for heat resistance.

Meanwhile, the RF heat dissipation plastic 100, 101 according to the present invention is manufactured by a manufacturing method, including (1) manufacturing a first filler 20 by treating at least a part of the surface of a high-strength filler **20*a* including at least one hydroxy group in the repeating unit thereof with an inorganic coating precursor; and (2) dispersing the first filler 20** in a polymer resin.

In this case, the inorganic coating precursor may be used without limitation, as long as it is a material capable of forming the above-described inorganic coating layer **20*b***, and preferably, it may be more advantageous to use tetrahydroxysilane (TEOS) in terms of improving the dispersibility of the first filler and preventing yellowing when the high-strength filler is a cellulose-based filler.

In step (1), the high-strength filler **20*a*** and the inorganic coating precursor may be treated at a weight ratio of 1:10 to 50, and preferably, at a weight ratio of 1:15 to 45. If the weight ratio of the high-strength filler and the inorganic coating precursor is less than 1:10 or the weight ratio is more than 1:50, the dispersibility of the first filler is not improved to a desired level, and if the high-strength filler is a cellulose-based filler, as the occurrence of yellowing cannot be prevented, low dielectric properties may not be expressed.

Meanwhile, step (1) may include (1)-1 reacting the high-strength filler and the inorganic coating precursor; and (1)-2 aging the reacted high-strength filler.

The step of reacting may be performed for 3 to 13 hours, and preferably, for 4 to 12 hours. If the step of reacting is performed for less than 3 hours or for more than 13 hours, the dispersibility of the first filler may not be improved to a desired level, and if the high-strength filler is a cellulose-based filler, as the occurrence of yellowing cannot be prevented, low dielectric properties may not be expressed.

In addition, the step of aging may be performed for 0.3 to 3 hours, and preferably, for 0.5 to 2.5 hours. If the step of aging is performed for less than 0.3 hours or for more than 3 hours, there may be a problem in that the dispersibility of the first filler is not improved to a desired level.

Figure 5:
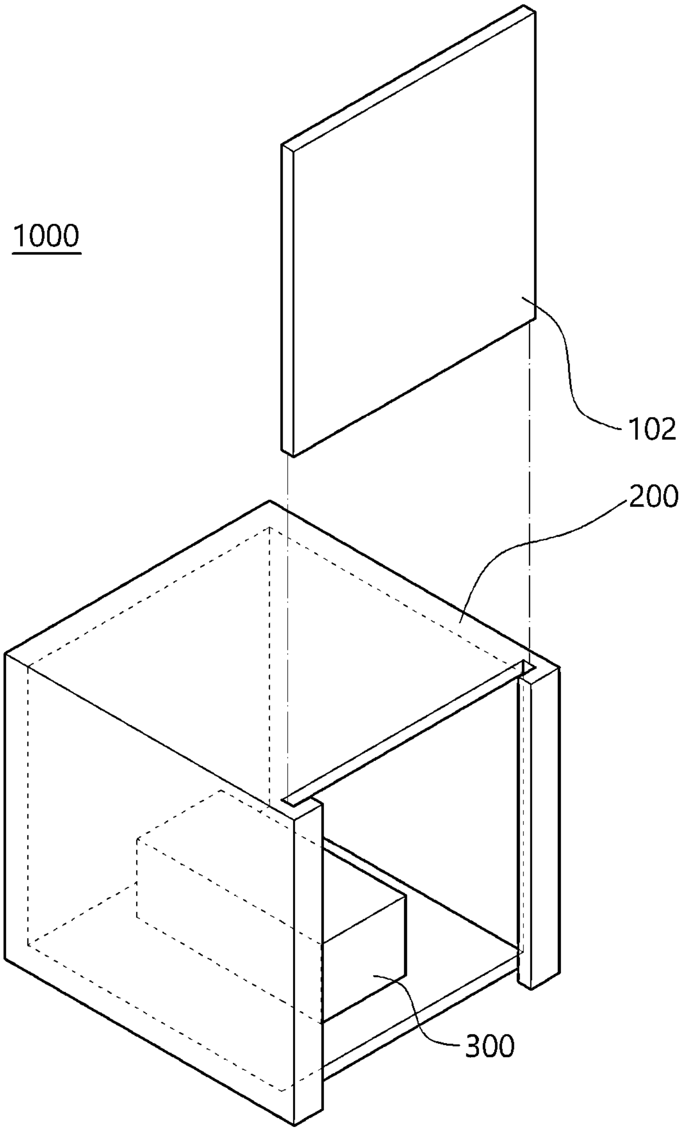
FIG. 5 is an assembled perspective view of the repeater including a repeater cabinet according to an exemplary embodiment of the present invention.

Meanwhile, as illustrated in FIG. 5, the present invention may be implemented as a repeater cabinet having an accommodating part, in which a relay unit 300 including a device for relaying an RF signal is accommodated therein, and at least a part of the cabinet is a heat dissipation plastic 102.

The RF heat dissipation plastic 102 may be implemented as at least a part or all of the repeater cabinet, and when implemented as at least a part as illustrated in FIG. 5, it may be composed of a first part which is the RF heat dissipation plastic 102 and a second part 200 which is other parts.

In this case, since the second part 200 may be a known material used as a repeater cabinet, the present invention does not specifically limit the same.

In addition, when the RF heat dissipation plastic 102 is implemented as all of the repeater cabinet, the first part which is the RF heat dissipation plastic 102 and the second part 200 may be implemented with the same material.

Meanwhile, the relay unit 300 may be an electronic device provided in a known repeater, and for example, it may be a front-end unit (FEU), a quad base radio (QBR), a router/SRI (site reference interface), a channel service unit (CSU), an optical terminal device, a rectifier or the like.

In addition, the repeater 1000 may further include a heat sink (not illustrated) or a fan (not illustrated) inside or outside the repeater cabinet to dissipate heat generated inside the repeater.

Meanwhile, the repeater 1000 may further include other configurations that may be further provided in a known repeater in addition to the above-described configurations, and the present invention does not particularly limit the same.

Modes of the Invention

The present invention will be described in more detail through the following examples, but the following examples are not intended to limit the scope of the present invention, and these examples should be construed to aid the understanding of the present invention.

Preparation Example 1: Preparation of First Filler

First, in order to prepare a first filler, cellulose nanofibrils as a high-strength filler and tetrahydroxysilane (TEOS) as an inorganic coating precursor were treated at a weight ratio of 1:30 and reacted for 8 hours, and by aging the reacted high-strength filler for 1.5 hours, first fillers as shown in in FIGS. 3 and 4 in which an inorganic coating layer was formed on the surface of the high-strength filler were prepared. In this case, in the prepared first filler, the average cross-sectional diameter of the high-strength filler was 10 μm and the average thickness of the inorganic coating layer was 15 nm, and the prepared first filler had 150 parts by weight of the inorganic coating layer based on 100 parts by weight of the high-strength filler.

Preparation Example 2: Preparation of Second Filler

First, in order to prepare a second filler, graphite with nickel (Ni) nanoparticles formed on the surface at 23° C. and in an atmospheric state was immersed in a coating composition in which dopamine at a concentration of 2 mM, 13 parts by weight of sodium periodate ($Na_2S_2O_8$) as an oxidizing agent and 20 parts by weigh of a buffer solution (Tris-base, Fisher) based on 100 parts by weight of dopamine were mixed in a solvent containing 65% by weight of pure water (DI water) and 35% by weight of methanol, and after stirring for 2.5 hours, it was filtered and washed with DI water and dried at 23° C. to form a catecholamine layer on the surface of graphite to prepare a second filler, which was a graphite composite. In this case, the average particle diameter of the second filler was 150 μm.

Example 1: Manufacture of RF Heat Dissipation Plastic

Based on 100 parts by weight of polypropylene (PP) as a base resin, 7 parts by weight of the first filler prepared according to Preparation Example 1 and 100 parts by weight of the second filler prepared according to Preparation Example 2 were mixed, and by compounding through a 15-pi twin-screw extruder, an RF heat dissipation plastic as shown in FIG. 2 was manufactured.

Examples 2 to 21 and Comparative Examples 1 to 2

RF heat dissipation plastics as shown in Tables 1 to 4 were manufactured in the same manner as in Example 1, except that the average cross-sectional diameter of the high-strength filler in the first filler, the average thickness of the inorganic coating layer, the content of the inorganic coating layer, the content and inclusion of the first filler, the average particle diameter, content and inclusion of the second filler were changed.

Experimental Example

The following physical properties were evaluated for each of the RF heat dissipation plastics manufactured according to the examples and comparative examples, and the results are shown in Tables 1 to 4.

1. Evaluation of Heat Dissipation Performance

In order to prevent external influences, performance evaluation was conducted in a sealed chamber measuring 30 cm×30 cm×30 cm in width, length and height, respectively. Specifically, a planar heating element was attached to the RF heat dissipation plastic, and heat was generated by applying a current of 350 mA, and after holding for 60 minutes, the temperature of the planar heating element was measured to evaluate the heat dissipation performance.

In this case, a high measurement temperature means poor heat dissipation performance, and a low measurement temperature means excellent heat dissipation performance.

In addition, based on the measurement temperature of Example 1 as 100, the measurement temperatures for the rest of the examples and comparative examples were shown as relative percentages.

2. Evaluation of Mechanical Strength

The flexural strengths of the RF heat dissipation plastics were evaluated using a universal tensile tester (Utm).

In this case, based on the flexural strength of Example 1 as 100, the flexural strengths of the other examples and comparative examples were shown as relative percentages.

3. Evaluation of Dielectric Constant and Dielectric Loss

For each RF heat dissipation plastic, the dielectric constant and dielectric loss were measured in the gigahertz (GHz) region through a resonant cavity by using a network analyzer (E8364A (45 MHz to 50 GHz), Agilent Technologies).

4. Evaluation of the Uniformity of Physical Properties

Each RF heat dissipation plastic was divided into 10 equal parts to evaluate the uniformity of physical properties.

Specifically, when the difference in any one or more of heat dissipation performance, mechanical strength, dielectric constant and dielectric loss in each of the RF heat dissipation plastics divided into 10 equal parts was 1% or less compared to the measured values measured in Sections 1 to 3 above, it was assigned ○, and when the error was more than 1% and 5% or less, it was assigned Δ, and when the error was more than 5%, it was assigned x to evaluate the uniformity of physical properties.

5. Evaluation of Surface Quality

For the RF heat dissipation plastics according to the examples and comparative examples, it was confirmed whether there was a bumpy or rough feeling by touching the surface with a hand in order to check the surface quality. When there was a smooth feeling, it was assigned 5, and when the area of the rough feeling was 2% or less of the total outer surface of the RF heat dissipation plastic, it was assigned 4, and when the area was more than 2% and 5% or less, it was assigned 3, and when the area was more than 5% and 10% or less, it was assigned 2, and when the area was more than 10% and 20% or less, it was assigned 1, and when the area was more than 20%, it was assigned 0.

TABLE 1

| Classification | | Example 1 | Example 2 | Example 3 | Example 4 | Example 5 | Example 6 |
|---|---|---|---|---|---|---|---|
| First filler | Average cross-sectional diameter of high-strength filler (μm) | 10 | 0.005 | 0.02 | 25 | 10 | 10 |
| | Average thickness of inorganic coating layer (nm) | 15 | 15 | 15 | 15 | 1 | 10 |
| | Content of inorganic coating layer (parts by weight) | 150 | 150 | 150 | 150 | 10 | 100 |
| | Content of first filler (parts by weight) | 7 | 7 | 7 | 7 | 7 | 7 |
| Second filler | Average particle diameter (μm) | 150 | 150 | 150 | 150 | 150 | 150 |
| | Content (parts by weight) | 100 | 100 | 100 | 100 | 100 | 100 |
| Evaluation of heat dissipation performance | | 100 | 102 | 101 | 100 | 101 | 100 |
| Evaluation of flexural strength | | 100 | 78 | 97 | 101 | 99 | 100 |
| Dielectric constant (@28 GHz) | | 2.00 | 2.01 | 2.01 | 2.02 | 2.27 | 2.02 |
| Dielectric loss (@28 GHz) | | 0.0005 | 0.0006 | 0.0005 | 0.0006 | 0.001 | 0.0006 |
| Uniformity of physical properties | | ○ | ○ | ○ | x | x | ○ |
| Surface quality | | 5 | 5 | 5 | 5 | 5 | 5 |

TABLE 2

| Classification | | Example 7 | Example 8 | Example 9 | Example 10 | Example 11 | Example 12 |
|---|---|---|---|---|---|---|---|
| First filler | Average cross-sectional diameter of high-strength filler (μm) | 10 | 10 | 10 | 10 | 10 | 10 |
| | Average thickness of inorganic coating layer (nm) | 20 | 35 | 15 | 15 | 15 | 15 |
| | Content of inorganic coating layer (parts by weight) | 200 | 350 | 150 | 150 | 150 | 150 |
| | Content of first filler (parts by weight) | 7 | 7 | 0.5 | 1.5 | 13 | 18 |
| Second filler | Average particle diameter (μm) | 150 | 150 | 150 | 150 | 150 | 150 |
| | Content (parts by weight) | 100 | 100 | 100 | 100 | 100 | 100 |
| Evaluation of heat dissipation performance | | 100 | 102 | 102 | 101 | 101 | 101 |
| Evaluation of flexural strength | | 100 | 100 | 76 | 96 | 97 | 81 |
| Dielectric constant (@28 GHz) | | 2.02 | 2.26 | 2.28 | 2.02 | 2.01 | 2.01 |
| Dielectric loss (@28 GHz) | | 0.0006 | 0.001 | 0.001 | 0.0006 | 0.0005 | 0.0005 |
| Uniformity of physical properties | | ○ | x | Δ | ○ | ○ | ○ |
| Surface quality | | 5 | 5 | 5 | 5 | 5 | 5 |

TABLE 3

| Classification | | Example 13 | Example 14 | Example 15 | Example 16 | Example 17 | Example 18 |
|---|---|---|---|---|---|---|---|
| First filler | Average cross-sectional diameter of high-strength filler (μm) | 10 | 10 | 10 | 10 | 10 | 10 |
| | Average thickness of inorganic coating layer (nm) | 15 | 15 | 15 | 15 | 15 | 15 |
| | Content of inorganic coating layer (parts by weight) | 150 | 150 | 150 | 150 | 150 | 150 |

TABLE 3-continued

| Classification | | Example 13 | Example 14 | Example 15 | Example 16 | Example 17 | Example 18 |
|---|---|---|---|---|---|---|---|
| | Content of first filler (parts by weight) | 7 | 7 | 7 | 7 | 7 | 7 |
| Second filler | Average particle diameter (μm) | 1 | 10 | 250 | 350 | 150 | 150 |
| | Content (parts by weight) | 100 | 100 | 100 | 100 | 10 | 50 |
| Evaluation of heat dissipation performance | | 129 | 104 | 100 | 101 | 141 | 106 |
| Evaluation of flexural strength | | 103 | 102 | 96 | 74 | 104 | 102 |
| Dielectric constant (@28 GHz) | | 2.01 | 2.01 | 2.00 | 2.01 | 2.01 | 2.01 |
| Dielectric loss (@28 GHz) | | 0.0005 | 0.0006 | 0.0005 | 0.0005 | 0.0005 | 0.0005 |
| Uniformity of physical properties | | x | ○ | ○ | Δ | Δ | ○ |
| Surface quality | | 5 | 5 | 5 | 2 | 5 | 5 |

TABLE 4

| Classification | | Example 19 | Example 20 | Example 21 | Comparative Example 1 | Comparative Example 2 |
|---|---|---|---|---|---|---|
| First filler | Average cross-sectional diameter of high-strength filler (μm) | 10 | 10 | 10 | 10 | — |
| | Average thickness of inorganic coating layer (nm) | 15 | 15 | 15 | — | — |
| | Content of inorganic coating layer (parts by weight) | 150 | 150 | 150 | — | — |
| | Content of first filler (parts by weight) | 7 | 7 | 7 | 7 | — |
| Second filler | Average particle diameter (μm) | 150 | 150 | — | 150 | 150 |
| | Content (parts by weight) | 150 | 250 | — | 100 | 100 |
| Evaluation of heat dissipation performance | | 96 | 94 | 149 | 102 | 102 |
| Evaluation of flexural strength | | 95 | 72 | 104 | 98 | 70 |
| Dielectric constant (@28 GHz) | | 2.01 | 2.00 | 2.01 | 2.29 | 2.3 |
| Dielectric loss (@28 GHz) | | 0.0005 | 0.0005 | 0.0005 | 0.0015 | 0.0016 |
| Uniformity of physical properties | | ○ | ○ | ○ | ○ | ○ |
| Surface quality | | 5 | 1 | 5 | 5 | 5 |

As can be seen from Tables 1 to 4, Examples 1, 3, 6, 7, 10, 11, 14, 15, 18, and 19, which satisfied all of the average cross-sectional diameter of the high-strength filler in the first filler according to the present invention, the average thickness of the inorganic coating layer, the content of the inorganic coating layer, the content and inclusion of the first filler, the average particle diameter, content and inclusion of the second filler, simultaneously exhibited all of the excellent heat dissipation performance, mechanical strength, uniformity of physical properties and surface quality and the effects of remarkably low dielectric constant and dielectric loss, compared to Examples 2, 4, 5, 8, 9, 12, 13, 16, 17, 20, 21 and Comparative Examples 1 to 2, in which any one of the above was omitted.

Although an exemplary embodiment of the present invention has been described above, the spirit of the present invention is not limited to the exemplary embodiment presented in the present specification, and those skilled in the art who understand the spirit of the present invention will be able to easily suggest other exemplary embodiments by modifying, changing, deleting or adding components within the scope of the same spirit, but this is also said to be within the scope of the present invention.

The invention claimed is:

1. An RF heat dissipation plastic, comprising:

a polymer matrix comprising a polymer resin;

a first filler that is dispersed in the polymer matrix and comprises a high-strength filler, which is comprised in an amount of 1 to 15 parts by weight based on 100 parts by weight of the polymer resin, is a cellulose-based filler including at least one hydroxy group and having an average cross-sectional diameter of 20 nm to 10 μm, and an inorganic coating layer formed on at least a part of the surface of the high-strength filler and having an average thickness of 10 to 20 nm, and the first filler comprises 100 to 200 parts by weight of the inorganic coating layer based on 100 parts by weight of the high-strength filler; and a second filler dispersed in the polymer matrix to improve heat dissipation characteristics in an amount of 50 to 150 parts by weight based on 100 parts by weight of the polymer resin, which is a graphite composite comprising a plate shape graphite, nanoparticles bonded to the surface of the graphite, and a catecholamine layer bonded to the surface of the nanoparticles bonded to the surface of the graphite, and a catecholamine layer bonded to the surface of the nanoparticles, and the second filler has an average particle diameter of 10 to 250 μm, wherein the RF heat dissipation plastic has a dielectric loss of 0.0005 to 0.0006 at 28 GHz.

2. The RF heat dissipation plastic of claim 1, wherein the cellulose-based filler comprises at least one selected from the group consisting of cellulose nanofibrils and cellulose fibers.

3. The RF heat dissipation plastic of claim 1, wherein the inorganic coating layer is an inorganic coating layer in which a silicon-based compound, which comprises at least one selected from the group consisting of a straight-chain silicic acid group in which two or more orthosilicic acid groups and orthosilicic acid groups are mutually polymerized, a pulverized silicic acid group in which four or more orthosilicic acid groups are mutually polymerized, and a cyclic silicic acid group in which three or more orthosilicic acid groups are mutually polymerized, is combined with the high-strength filler.

4. The RF heat dissipation plastic of claim 3, wherein in the first filler, at least one hydroxy group of the silicon-based compound is chemically bonded to a hydroxy group of the high-strength filler.

5. The RF heat dissipation plastic of claim 1, wherein the polymer resin comprises one compound or two or more compounds or copolymers selected from the group consisting of polycarbonate, polyamide, polyester, polyketone, liquid crystal polymer, polyolefin, polyphenylene sulfide (PPS), polyether ether ketone (PEEK), polyphenylene oxide (PPO), polyether sulfone (PES), polyether imide (PEI), polyimide (PI), polyphthalamide (PPA), polybutylene terephthalate (PBT), acrylonitrile butadiene styrene copolymer resin (ABS), polymethyl methacrylate (PMMA) and polyarylate (PAR).

6. A repeater cabinet having an accommodating part in which a device for relaying an RF signal is accommodated therein, wherein at least a part of the repeater cabinet is the RF heat dissipation plastic of claim 1.

7. A method for manufacturing an RF heat dissipation plastic, comprising:

(1) manufacturing a first filler by treating at least a part of the surface of a high-strength filler, which is a cellulose-based filler including at least one hydroxy group and having an average cross-sectional diameter of 20 nm to 10 μm, with an inorganic coating precursor to form an inorganic coating layer having a thickness of 10 to 20 nm on at least part of the surface, and the first filler comprises 100 to 200 parts by weight of the inorganic coating layer based on 100 parts by weight of the high-strength filler; and (2) dispersing the first filler and a second filler in order to improve heat dissipation characteristics in a polymer resin, wherein the first filler is comprised in an amount of 1 to 15 parts by weight based on 100 parts by weight of the polymer resin and the second filler is comprised in an amount of 50 to 150 parts by weight based on 100 parts by weight of the polymer resin, and wherein the second filler is a graphite composite comprising a plate shape graphite nanoparticles bonded to the surface of the graphite, and a catecholamine layer bonded to the surface of the nanoparticles, and the second filler has an average particle diameter of 10 to 250 μm, and wherein the RF heat dissipation plastic has a dielectric loss of 0.0005 to 0.0006 at 28 GHz.

8. The method of claim 7, wherein the inorganic coating precursor comprises tetraethyl orthosilicate (TEOS).

9. The method of claim 7, wherein step (1) treats the high-strength filler and the inorganic coating precursor at a weight ratio of 1:10 to 50.

10. The method of claim 7, wherein step (1) comprises:

(1)-1 reacting the high-strength filler and the inorganic coating precursor for 3 to 13 hours; and (1)-2 aging the reacted high-strength filler for 0.3 to 3 hours.

* * * * *